US 11,578,610 B2

(12) United States Patent
Hrubec et al.

(10) Patent No.: US 11,578,610 B2
(45) Date of Patent: Feb. 14, 2023

(54) SYSTEM AND METHOD FOR REDUCING EDGE CONTACT STRESS CONCENTRATIONS IN A PRESS-FIT

(71) Applicant: GE Avio S.r.l., Turin (IT)

(72) Inventors: Juraj Hrubec, Dolny Kubin (SK); Leonardo Coviello, Bari (IT)

(73) Assignee: GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 17/352,107

(22) Filed: Jun. 18, 2021

(65) Prior Publication Data

US 2022/0049617 A1    Feb. 17, 2022

(30) Foreign Application Priority Data

Jun. 19, 2020   (EP) ..................... 20181269

(51) Int. Cl.
| | | |
|---|---|---|
| *F16H 1/28* | (2006.01) | |
| *F01D 15/12* | (2006.01) | |
| *F16H 57/023* | (2012.01) | |
| *F16H 57/08* | (2006.01) | |
| *F16H 1/32* | (2006.01) | |

(52) U.S. Cl.
CPC ........... *F01D 15/12* (2013.01); *F16H 1/2836* (2013.01); *F16H 1/32* (2013.01); *F16H 57/023* (2013.01); *F16H 57/082* (2013.01); *F05D 2220/32* (2013.01); *F05D 2260/40311* (2013.01)

(58) Field of Classification Search
CPC .......... F01D 15/12; F16H 1/2836; F16H 1/32; F16H 57/023; F16H 57/082; F16H 2057/085; F16H 57/08; F05D 2220/32; F05D 2260/40311; F02C 7/36; F02C 3/04; F02C 7/00

See application file for complete search history.

(56) References Cited

U.S. PATENT DOCUMENTS

| | | |
|---|---|---|
| 5,102,379 A | 4/1992 | Pagluica et al. |
| 6,409,414 B1 | 6/2002 | Altamura et al. |
| 8,216,108 B2 | 7/2012 | Montestruc |
| 8,333,678 B2 | 12/2012 | McCune |
| 8,430,776 B2 | 4/2013 | Palfai et al. |
| 8,727,935 B2 | 5/2014 | Coffin |
| 8,961,112 B2 | 2/2015 | Coffin et al. |
| 8,986,160 B2 | 3/2015 | Altamura et al. |
| 9,982,771 B2 | 5/2018 | Muldoon |
| 10,683,773 B2 * | 6/2020 | Savaria ............... F16H 57/0479 |
| 10,851,671 B2 * | 12/2020 | Simard-Bergeron ... F16C 17/02 |
| 2010/0077881 A1 | 4/2010 | Hicks |
| 2013/0184120 A1 * | 7/2013 | Altamura ............... F16H 1/2836 475/346 |

FOREIGN PATENT DOCUMENTS

| | | |
|---|---|---|
| EP | 2532919 A2 | 12/2012 |
| EP | 3029358 A1 | 6/2016 |

* cited by examiner

*Primary Examiner* — Justin Holmes
(74) *Attorney, Agent, or Firm* — Venable LLP; Peter T. Hrubiec; Michele V. Frank

(57) ABSTRACT

An apparatus and method for reducing edge contact stress concentrations in a press-fit. The apparatus and method of the present disclosure specifically provide for a press-fit collar having a channel circumscribing a collar axis. The channel having an asymmetrical cross-sectional profile in a radial face. The asymmetrical cross-sectional profile being configured to reduce an edge contact pressure.

20 Claims, 9 Drawing Sheets

SYSTEM AND METHOD FOR REDUCING EDGE CONTACT STRESS CONCENTRATIONS IN A PRESS-FIT

CROSS REFERENCE TO RELATED APPLICATIONS

The present application claims priority to European Patent Application No. 20181269.0 filed, Jun. 19, 2020, which is hereby incorporated by reference in its entirety.

The project leading to this application has received funding from the Clean Sky 2 Joint Undertaking under the European Union's Horizon 2020 research and innovation program under grant agreement No. 807085-ENG GAM 2018-H2020-IBA-CS2-GAMS-2017/H2020-IBA-CS2-GAMS-2017

FIELD

The present subject matter relates generally to a system and method for reducing edge contact stress concentrations in a press-fit, in particular for aeronautic applications, to which the following description refers, but without any loss of generality.

BACKGROUND

Epicyclic gearing is a widely used in the field of aeronautic engines for transmitting drive and converting power between a turbine engine and a propulsive element, such as a fan. The use of a gearbox with an epicyclic gearing arrangement allows the fan to be rotated at fewer revolutions per unit of time than the rotational speed of the low-pressure shaft of the engine, for greater efficiency. The gearbox rotatably supports a sun gear that is disposed centrally with respect to a ring gear and a plurality of planet gears mounted on a planet-carrier, which are disposed around the sun gear and engage between the sun gear and the ring gear. The low-pressure shaft provides the input to the epicyclic gearing arrangement, being coupled to the sun gear, while the fan is coupled to rotate in unison with the planet-carrier. Each planet gear meshes with the sun gear and with the ring gear, which is held stationary. The shaft of the fan is rotatable on its own bearing that is housed in a sun gear box, which is also called the fan gearbox, that is fixed to the rotationally central region of a carrier. Each planet gear is rotatable on a bearing mounted on a planet pin, which is fixed to the peripheral region of the carrier.

For aviation applications, there is a continuing need to reduce the size and weight of gearboxes and gearbox components while also improving lifespan. Thus, the art is continuously seeking new and improved systems and methods that address the desire to reduce the size and weight of gearboxes. As such, an apparatus and method for reducing edge contact stress concentrations in a press-fit, would be beneficial.

BRIEF DESCRIPTION

Aspects and advantages of the invention will be set forth in part in the following description, or may be obvious from the description, or may be learned through practice of the invention.

In one aspect, the present disclosure is directed to an epicyclic gearing for a gas turbine aviation engine. The epicyclic gearing may include a plurality of planet gears circumferentially disposed about a transmission axis and operably coupled to a plurality of planet pins. The epicyclic gearing may also include a planet-carrier. The planet-carrier may include a side plate having a coupling portion for connecting the side plate to a rotating member or to a static structure. The planet-carrier may also include a central ring coaxial with the side plate along the transmission axis. Each planet pin may be coupled to the central ring via a press-fit collar. The press-fit collar may define a collar axis and include an annular body. The annular body may have a first radial contact face defining a collar outer diameter. The first radial contact face may be configured to interface with a pin opening defined by the central ring. The annular body may also include a second radial contact face disposed radially inward of the first radial contact face. The second radial contact face may define a collar inner diameter centered about a collar axis. The second radial contact face may be configured to accept one of the planet pins. Additionally, the annular body may include an axial face extending between the first radial contact face and the second radial contact face. The axial face may be oriented toward the planet gears. The axial face may define a channel having an asymmetrical cross-sectional profile. The channel may circumscribe collar axis. The asymmetrical cross-sectional profile may be configured to reduce an edge contact pressure.

In an embodiment, the axial face may also include a first axial portion extending along the axial face between the second radial contact face and a first slope face of the channel. The first axial portion may have a first portion thickness. The axial face may also include a second axial portion extending along the axial face between the first radial contact face and a second slope face of the channel. The second axial portion may have a second portion thickness. The second portion thickness may be greater than the first portion thickness. In an additional embodiment, the channel may include a base portion disposed between the first slope face and the second slope face. The base portion may define a first angle relative to the second radial contact face which is less than 90°. The first slope face may define a second angle relative to the second radial contact face which is less than the first angle.

In an additional embodiment, the axial face may be a first axial face at a first axial position. The press-for collar may also include a second axial face extending between the first radial contact face and the second radial contact face at a second radial actual position. The second axial face may define a recess circumscribing the collar axis.

In yet another embodiment, the central ring may include a groove circumscribing the collar axis.

In an additional embodiment, the plurality of planet pins may include at least five planet pins.

In another aspect, the present disclosure is directed to a press-fit collar for coupling a first component to a second component. The press-fit collar may define a collar axis and include an annular body. The annular body may include a first radial contact face defining a collar outer diameter. The first radial contact face may be configured to interface with the first component. The annular body may also include a second radial contact face disposed radially inward of the first radial contact face. The second radial contact face may define a collar inner diameter centered about a collar axis. The second radial contact face may be configured to interface with the second component. The annular body may further include an axial face extending between the first radial contact face and the second radial contact face. The axial face may define a channel having an asymmetrical cross-sectional profile. The channel may circumscribe the collar axis. The asymmetrical cross-sectional profile may be configured to reduce an edge contact pressure.

In another aspect, present disclosure is directed to a method for reducing edge contact stress concentrations in a press-fit. The method may include forming a channel having an asymmetrical cross-sectional profile which circumscribes a collar axis in an axial face of a press-fit collar. The press-fit collar may define the collar axis and may include an annular body having a first radial contact face and a second radial contact face. The axial face may extend between the first radial contact face and the second radial contact face. The method may include pressing the press-fit collar into an opening defined by a first component so that the radial first contact face interfaces with the first component. The method may also include pressing a second component into an opening defined by the second radial contact face of the press-fit collar so that the second radial contact face interfaces with the second component thereby coupling the second component to the first component.

In an additional embodiment, the method may also include calculating a first edge stress concentration along the first radial contact face. The method may include calculating a second edge stress concentration along the second radial contact face. Further, the method may include forming a base portion of the channel. The base portion may define a first angle relative to the second radial contact face which is less than 90-degrees. The first angle may be set so as to transmit a portion of the second edge stress concentration radially outward from the radial contact face. The method may include forming a first slope face of the channel. The first slope face may define a second angle relative to the second radial contact face which is less than the first angle, the second angle being set so as to transmit a portion of the second edge stress concentration radially outward from the second radial contact face. The method may further include forming a second slope face of the channel. The second slope face may be disposed radially outward of the first slope face. The base portion may be disposed between the first slope face and a second slope face.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
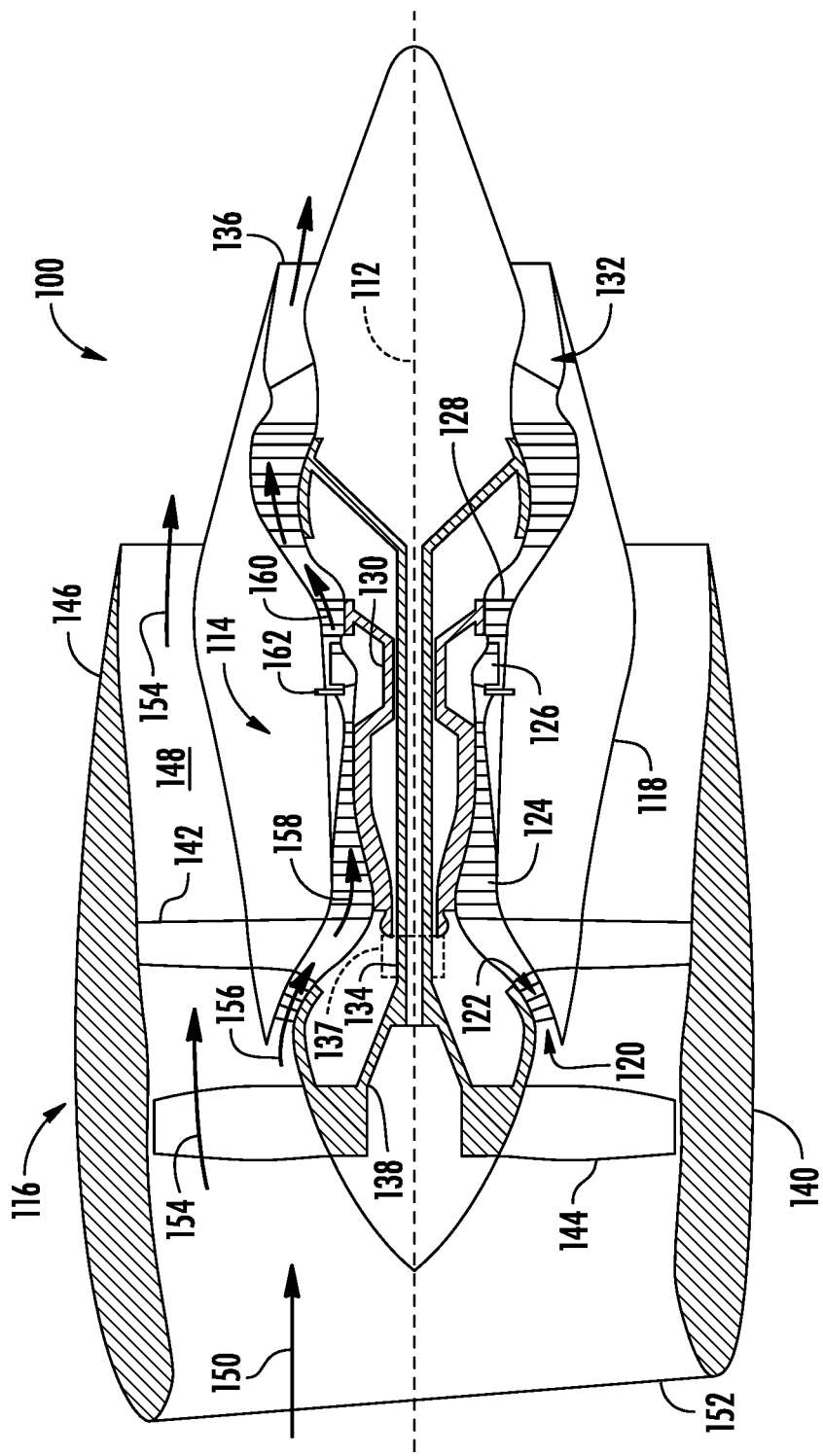
FIG. 1 illustrates a schematic cross-sectional view of an exemplary gas turbine engine according to various embodiments of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

An apparatus and method are generally provided for reducing edge contact stress concentrations in a press-fit. The press-fit collar and method of the present disclosure specifically provide for a press-fit collar for coupling a first component to a second component. The press-fit collar may define a collar axis and include an annular body (e.g., a cylindrical body). The annular body may have a first radial contact face which interfaces with the first component. This radial contact face may also define the outer diameter of the press-fit collar. The annular body may also have a second radial contact face which is radially inward of the first radial contact face. The second radial contact face may define an opening in the center of the annular body and the collar inner diameter. The body may be centered about a collar axis. The second radial contact face may interface with the second component. The contact faces may be joined by an axial face extending between them. The axial face may define a channel which circumscribes the collar axis. The channel may have an asymmetrical cross-sectional profile. The asymmetrical cross-sectional profile may reduce an edge contact pressure in a press-fit joint by directing the stress loads away from the contact faces.

For any given gas turbine engine application, the planet gears are designed to provide a set reduction ratio between the rotational speed of the low-pressure shaft and the rotational speed of the fan shaft. Because each epicyclic gearbox that houses the planet gears is disposed within the flow path of the gas turbine engine, the challenge is to design, on the one hand, a reliable and robust epicyclic gearbox that meets all flight conditions of the engine while, on the other hand, designing a epicyclic gearbox that is compact sufficiently to fit inside the flow path in a way that does not require the entire engine size to be larger and heavier than otherwise would be required in order to accommodate the epicyclic gearbox.

In certain applications, it may be desirable to have a high number of planet gears in the epicyclic gearbox. However, due to the gearbox size limitations described above, these planet gears may be relatively small and may provide a limited space for the planet pins. As a result, the planet pins may be relatively small and may develop high levels of edge contact pressure in the press-fit coupling with the planet carrier.

As all Reducing edge contact pressures in a press-fit may permit the use of smaller pins. This, in turn, may reduce the requirement to oversize other components. As a result, it may be possible to increase the number of press-fits which may be fitted into a given space or reduce the volume of space while retaining the ability to handle a certain load.

Referring now to the drawings, FIG. 1 illustrates a cross-sectional view of one embodiment of a gas turbine engine 100 that may be utilized with an aircraft in accordance with aspects of the present subject matter, with the engine 100 being shown having a longitudinal or axial centerline axis 112 extending therethrough for reference purposes. The engine 100 will be discussed in detail below. Although shown as a turbofan jet engine, any suitable turbomachine can be utilized with the systems described herein. For example, suitable turbomachines include, but are not limited to, high-bypass turbofan engines, low-bypass turbofan engines, turbojet engines, turboprop engines, turboshaft engines, propfan engines, and so forth.

Figure 2:
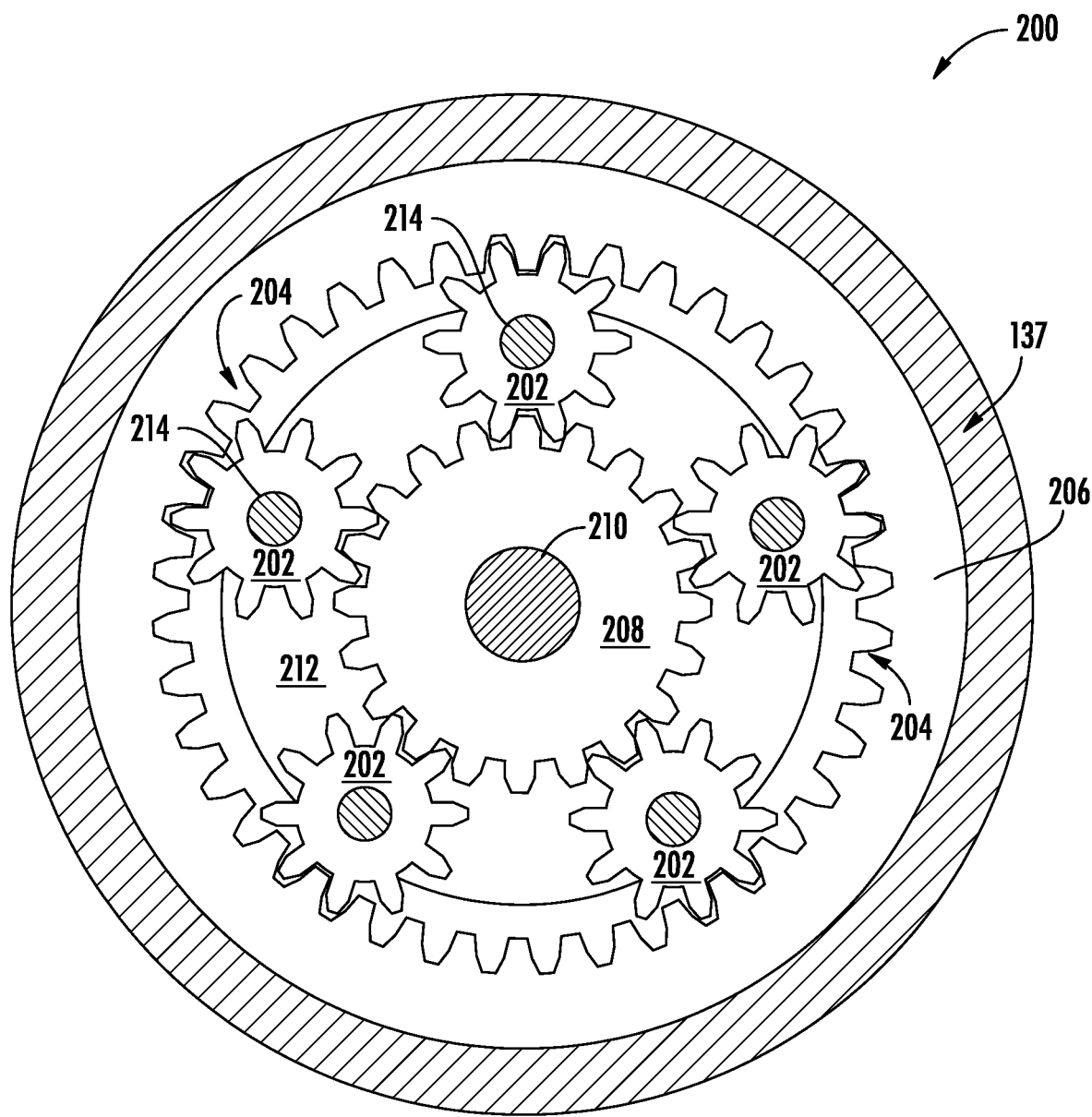
FIG. 2 illustrates a simplified view of an epicyclic gearing, such as for use in the exemplary gas turbine engine of FIG. 1 according to the present disclosure.
Figure 3A:
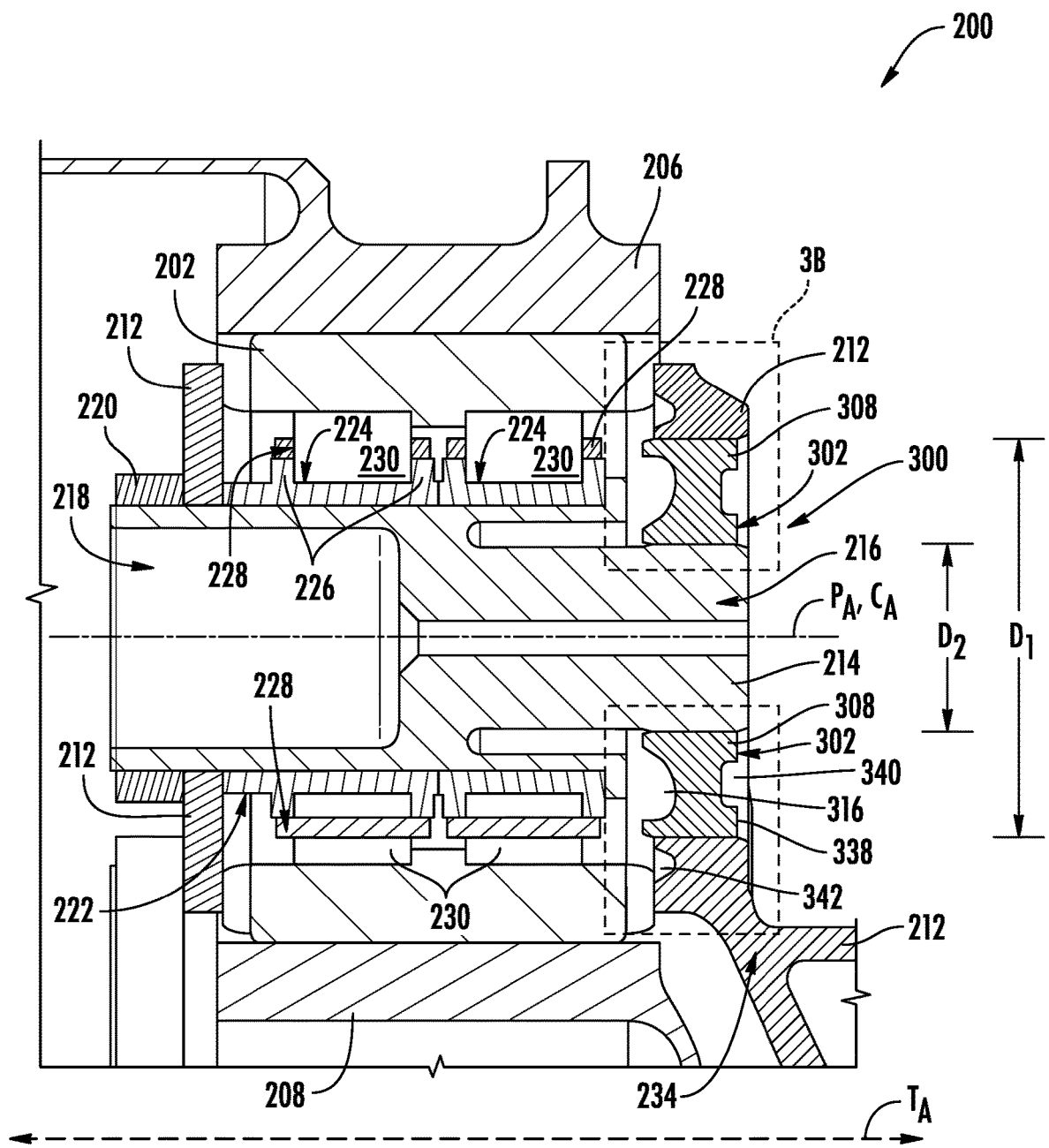
FIG. 3A depicts a cross-section view of a portion of an epicyclic gearing, such as is illustrated in FIG. 2 particularly illustrating a planet gear supported by planet pin and interfacing a ring gear and a sun gear according to the present disclosure.

FIG. 2 illustrates a simplified view of an exemplary epicyclic gearing 200 and FIG. 3 depicts a cross-section view of a portion of the epicyclic gearing 200. The exemplary epicyclic gearing 200 may be employed in applications wherein a relatively high torque capability is required from a gear train having a reduced volume. For example, the epicyclic gearing 200 may be employed in the gas turbine engine 100 to transfer a torque load from a low-pressure drive shaft 134 to a fan rotor 138.

As depicted in FIG. 2, the epicyclic gearing 200 may include a plurality of planet gears 202 which are arranged about a transmission axis (FIG. 3, $T_A$). For example, the planet gears 202 may be circumferentially disposed about the transmission axis ($T_A$). Each of the planet gears 202 may be operably coupled to a planet pin 214 and may rotate about respective planet axis ($P_A$). The planet pins 214 may be coupled to a planet-carrier (carrier) 212. The carrier 212 may include a side plate 232 (FIG. 4) having a coupling portion for connecting the side plate to a rotating member or a static structure. The carrier 212 may also include a central ring 234 (FIG. 3). The central ring 234 may be coaxial with the side plate to 32 along the transmission axis ($T_A$). The planet pins 214 may be coupled to the central ring 234 via a press-fit collar 302 (FIG. 3).

In an embodiment, The planet gears 202 may mesh outwardly with the inner toothings 204 of a ring gear 206. The planet gears 202 may also mesh inwardly with at least one sun gear(s) 208. The sun gear 208 may be coaxial and fixed with respect to a shaft 210. In at least one embodiment, the shaft 210 may correspond to the low-pressure drive shaft 134 of a gas turbine engine.

Figure 3B:
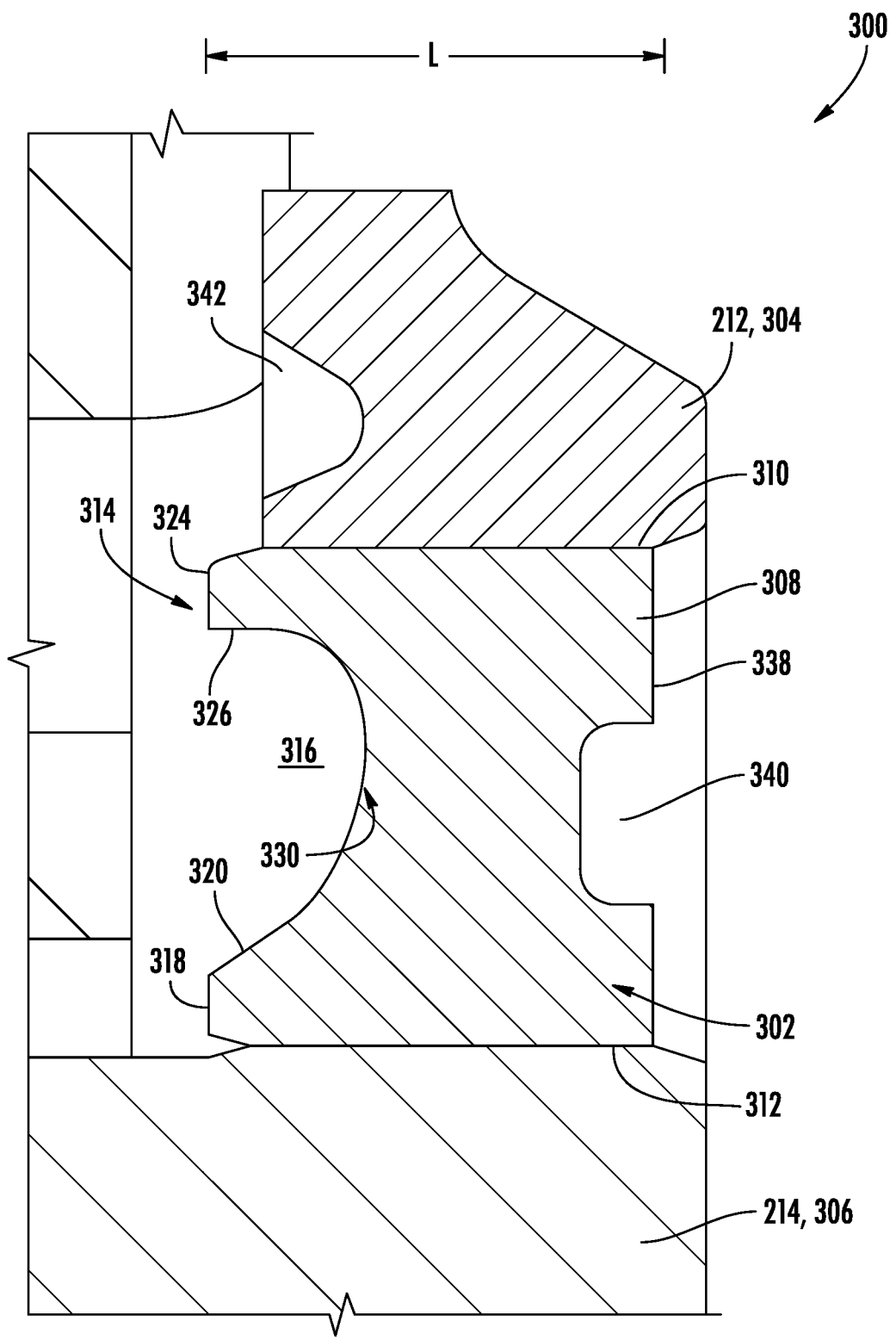
FIG. 3B depicts a close up view of a segment of the epicyclic gearing of FIG. 3A.
Figure 4:
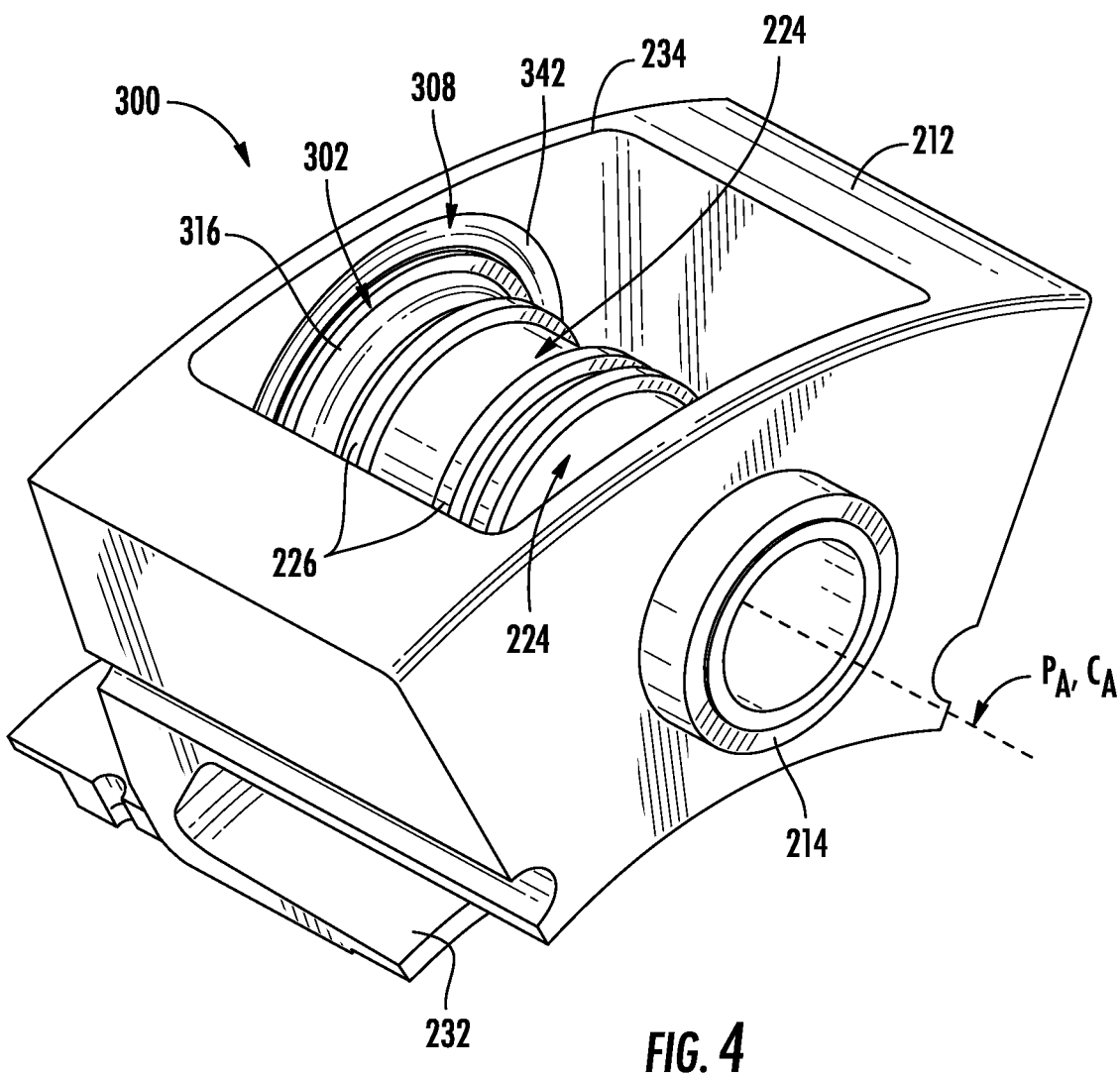
FIG. 4 shows a perspective view of a planet pin coupled to a planet carrier via a press-fit collar according to the present disclosure.
Figure 5:
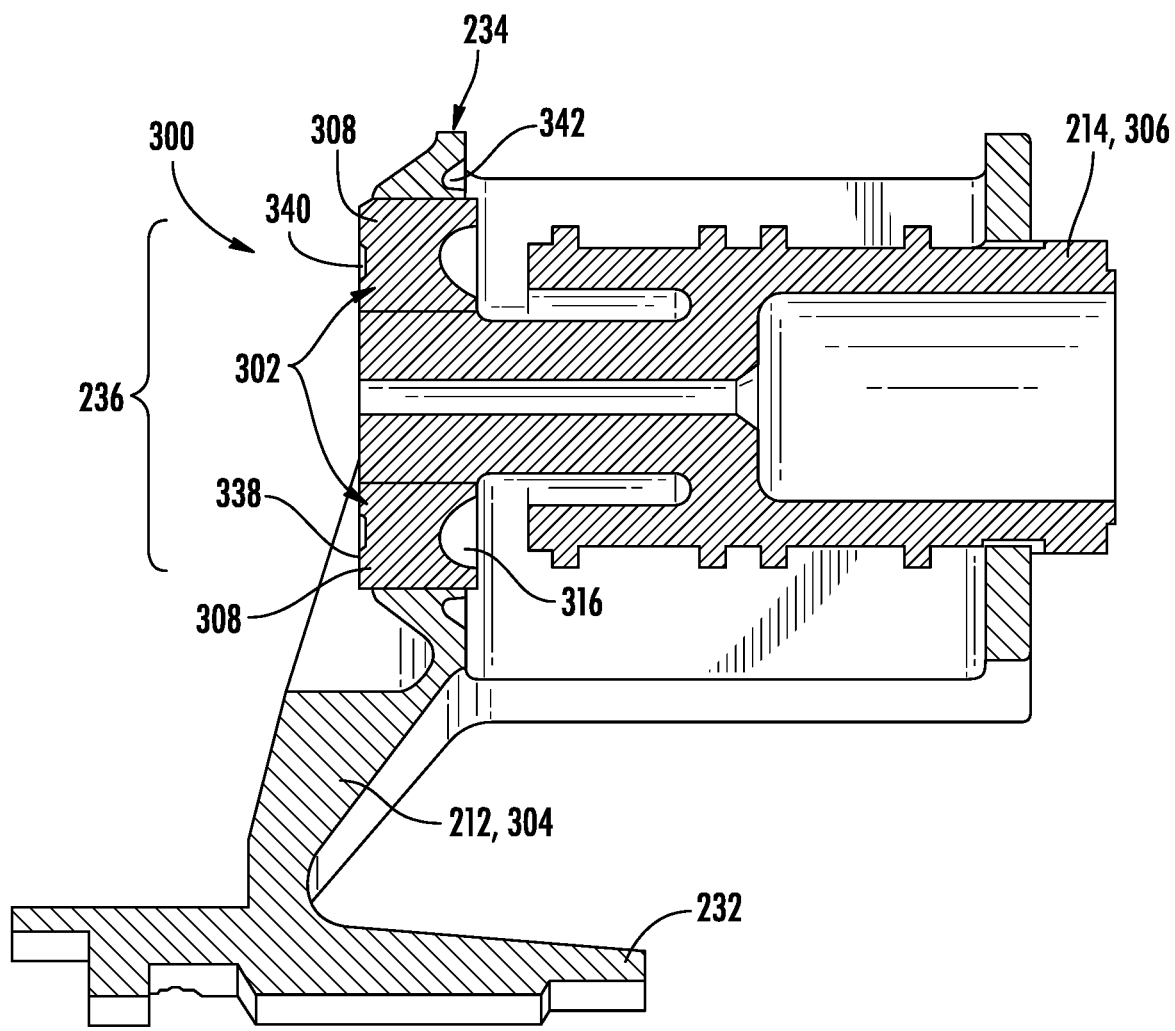
FIG. 5 depicts a cross-section view of the a planet pin coupled to a planet carrier via a press-fit collar of FIG. 4 according to the present disclosure.

As shown in FIGS. 3-5 for example, the planet pin(s) 214 may be hollow and generally cylindrical. A first end 216 of the planet pin(s) 214 may be coupled to the carrier 212 via a press/interference fit coupling 300. A second end 218 of the planet pin(s) 214 may be engaged by a retainer 220, which may be a threaded lock nut. The retainer 220 may facilitate securing the planet pin(s) 214 in position relative to the carrier 212.

The planet pin(s) 214 may include a plurality of feed holes formed therein and extending radially therethrough, as the number and placement of these feed holes is conventional as far as the present disclosure is concerned, none of them is shown in the drawings herein. In operation, oil may be fed through the planet pin(s) 214 and through such feed holes to facilitate the rotation of the planet gears 202.

In an embodiment, an outer surface 222 of the planet pin(s) 214 may be formed so as to define a plurality of bearing races 224. However, it should be appreciated that the bearing races 224 may be a separate component which may be press-fitted to the outer surface 222 of the planet pin(s) 214. The bearing races 224 may be defined by a pair of guide rails 226 which are spaced apart from each other, for example in an axial direction, and extend circumferentially around the planet axis ($P_A$). The respective pairs of guide rails 226 may provide guiding surfaces for a respective roller cage 228. Each bearing race 224 and the respective roller cage 228 may be configured to receive, and rotatably guide therein, a respective plurality of cylindrical rollers 230. The cylindrical rollers 230 may facilitate the rotation of the planet gears 202 about the planet pins 214. It should be appreciated that while described herein as a plurality of bearing races 224, in some embodiments, a single bearing race 224 may be employed.

FIGS. 3-6 illustrate embodiments of a press-fit coupling 300 including a press-fit collar 302. As disclosed herein, the press-fit collar 302 may be utilized to couple a first component 304 to a second component 306. In an embodiment, the first component may be the carrier 212 and the second component 306 may be the planet pin 214 discussed herein. However, it should be appreciated that the present disclosure is not limited to such embodiments.

In an embodiment, the press-fit collar 302 may define a collar axis ($C_A$) and an annular body 308. The annular body 308 may be formed from a metallic alloy or other material having sufficient load carrying capability. For example the annular body 308 may be formed from a material have sufficient load bearing capacity to accept the loads which may be encountered in an epicyclic gearing 200 of a gas turbine engine 100.

In an embodiment, the annular body 308 may include a first radial contact face 310. The first radial contact face 310 may define a collar outer diameter ($D_1$). The first radial contact face 310 may be configured to interface with the first component 304. For example, in an embodiment, the first radial contact face 310 may interface with a pin opening 236 defined by the central ring 234. In an embodiment, the first radial contact face 310 may interface with the first component 304 along substantially the entirety of an axial length (L) of the annular body 308. It should be appreciated that the interface between the first component 304 and the first radial contact face 310 may be a frictional contact.

The annular body 308 may, in an embodiment, also include a second radial contact face 312. The second radial contact face 312 may be disposed radially inward of the first radial contact face 310. The second radial contact face 312 may define a collar inner diameter ($D_2$). The collar inner diameter ($D_2$) may be centered about the collar axis ($C_A$). The second radial contact face 312 may be configured to interface with the second component 306. For example, the second radial contact face 312 may, in an embodiment, be configured to accept and secure the planet pin 214. In an embodiment, the second radial contact face 312 may interface with the second component 306 along substantially the entirety of the axial length (L) of the annular body 308. It should be appreciated that the interface between the second component 306 and the second radial contact face 312 may be a frictional contact.

As is depicted in FIGS. 3-6, the annular body 308 may include an axial face 314 extending between the first radial contact face 310 and the second radial contact face 312. In an embodiment, the axial face 314 may be oriented toward a load acting on the second component 306. The axial face 314 may define a channel 316 having an asymmetrical cross-sectional profile. As is particularly illustrated in FIGS. 3B and 6. The channel 316 may circumscribe the collar axis ($C_A$). The asymmetrical cross-sectional profile of the channel 316 may be configured to reduce an edge contact pressure within the press-fit coupling 300. In an embodiment, the geometry of the asymmetrical cross-sectional profile may permit at least a 40% reduction in contact pressure relative to a press-fit collar lacking the channel 316. For example, the geometry of the channel 316 may alleviate the contact pressure developed at the second radial contact face 312 by permitting the distribution of the loading developed therein to a greater portion of the press-fit collar 302. This distribution may be attributable to an increase in the flexibility of the press-fit collar 302 resulting from the asymmetrical cross-sectional geometry of the channel 316 circumscribing the collar axis ($C_A$). It should be appreciated that the cross-sectional profile of the channel 316 may lack a radial symmetry and/or an axial symmetry.

Figure 6:
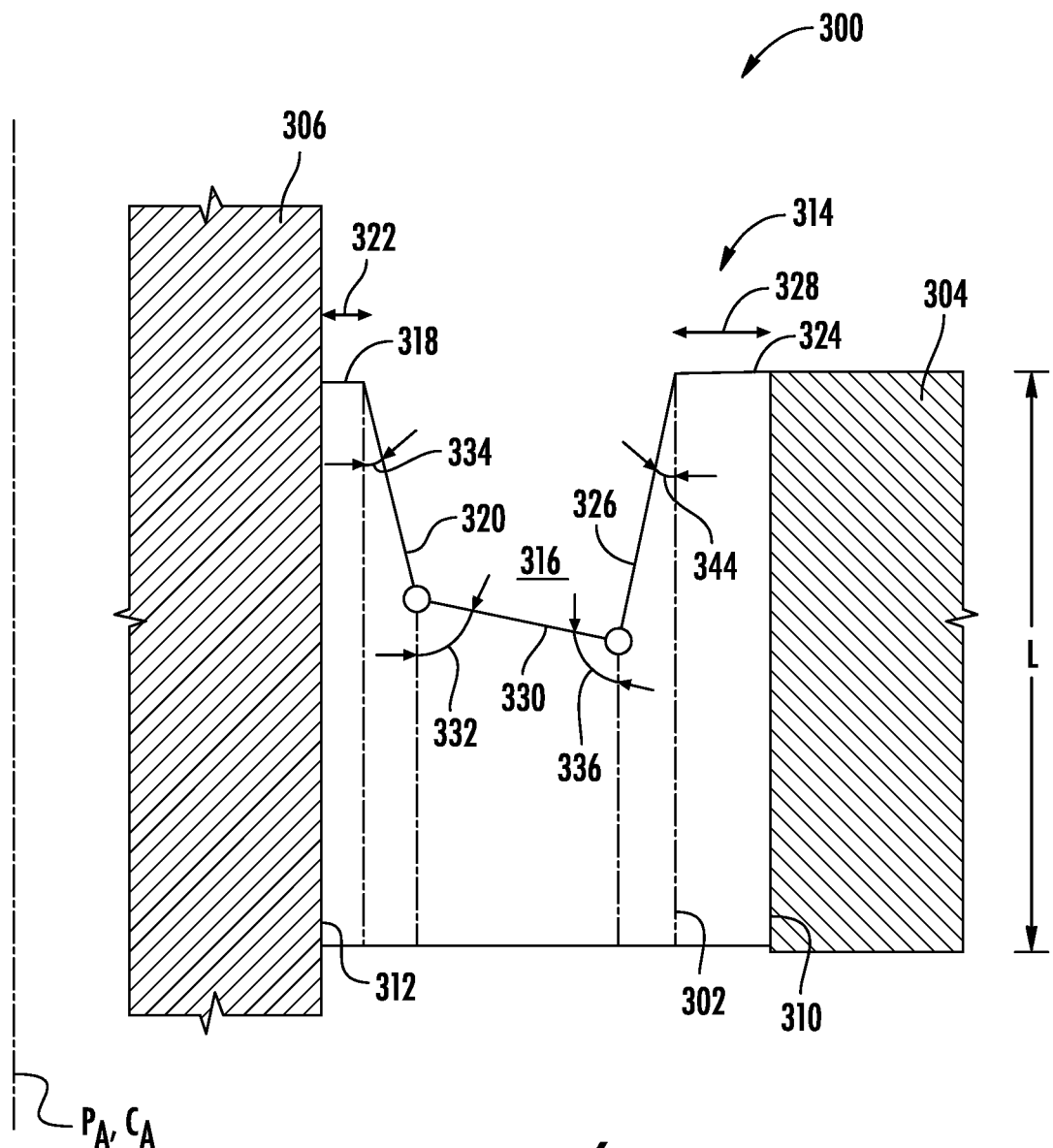
FIG. 6 shows a simplified schematic view of a press-fit collar according to the present disclosure.

Referring particularly to FIGS. 3B and 6, in an embodiment, the press-fit collar 302 may include a first axial portion 318 extending along the axial face 314 between the second radial contact face 312 and a first slope face 320 of the channel 316. The first axial portion 318 may define a first portion thickness 322. Additionally, in an embodiment, the press-fit collar 302 may include a second axial portion 324 extending along the axial face 314 between the first radial contact face 310 and a second slope face 326 of the channel 316. The second axial portion 324 may define a second portion thickness 328. In an embodiment, the second portion thickness 328 may be greater than the first portion thickness 322. It should be appreciated that the first axial portion 318, being thinner than the second axial portion 324, may result in a portion of the second radial contact face 312 having a flexibility which is greater than a maximal flexibility of the first radial contact face 310. It should further be appreciated that the first axial portion 318 and the second axial portion 324 may be positioned at the same axial location.

In an embodiment, the channel 316 may also include a base portion 330 disposed between the first slope face 320 and the second slope face 326. The base portion may define a first angle 332 relative to the second radial contact face 312. The first angle 332 may be less than 90-degrees. For example, in an embodiment, the first angle 332 may be greater than 45-degrees and less than or equal to 80-degrees. In an additional embodiment, the first angle 332 may be greater than 55-degrees and less than 65-degrees. In a further embodiment, the first angle 332 may be greater than or equal to 70-degrees and less than or equal to 80-degrees. Additionally, the first slope face 320 may define a second angle 334 relative to the second radial contact face 312 which is less than the first angle 332. For example, in an embodiment, the second angle 334 may be less than 45-degrees. In an additional embodiment, the second angle 334 may be greater than or equal to 15-degrees and less than or equal to 30-degrees. In a further embodiment, the second angle 334 may be greater than or equal to 30-degrees and less than or equal to 40-degrees.

It should be appreciated that the geometry of the asymmetrical cross-sectional profile of the channel 316 may be formed so that the second angle 334 is less than the first angle 332 and the first angle 332 is less than 90-degrees. Such an asymmetrical cross-sectional profile may facilitate the transfer of contact stress concentrations from the second radial contact face 312 radially outward from the collar axis ($C_A$). For example, the contact stress concentrations may be transferred from the first angle 332 toward a third angle 336 defined between the base portion 330 and the first radial contact face 310. In an embodiment, the third angle 336 may be greater than 90-degrees. Accordingly, in an embodiment, the angle formed between the base portion 330 and the first slope face 320 may be greater than the angle formed between the base portion 330 and the second slope face 326. As such, the stress concentrations may be transferred from the first slope face 320/base portion 330 angle toward the second slope face 326/base portion 330 angle. Therefore, it should be appreciated that decreasing the magnitude of the second angle 334 may reduce contact stress concentrations along the second radial contact face 312. Additionally, it should be appreciated that the second portion thickness 328 may be determined by establishing a fourth angle 344 between the second slope face 326 and the first radial contact face 310.

Referring now to FIGS. 3 and 5, in an embodiment, the axial face 314 may be a first axial face located at a first axial position. In such an embodiment, the press-fit collar 302 may also include a second axial face 338 extending between the first radial contact face 310 and the second radial contact face 312. The second axial face 338 may be located at a second axial position. The second axial face 338 may define a recess 340. The recess 340 may circumscribe the collar axis ($C_A$). In an embodiment, the recess 340 may be centered between the first radial contact face 310 and the second radial contact face 312. The recess 340 may be configured to increase the flexibility of the press-fit collar 302 thereby reducing an edge contact stress concentration.

Referring now to FIG. 3-5, in an embodiment, first component 304 may include a groove circumscribing the collar axis ($C_A$). In such an embodiment, the groove 342 may be positioned radially outward of the press-fit collar 302. The groove 342 may be oriented in the same axial direction has the channel 316. In an embodiment, the groove 342 may have a maximal depth which is less than a maximal depth of the channel 316. It should be appreciated that the groove 342 may facilitate a reduction in an edge contact stress concentration of the press-fit collar 302.

Figure 7:
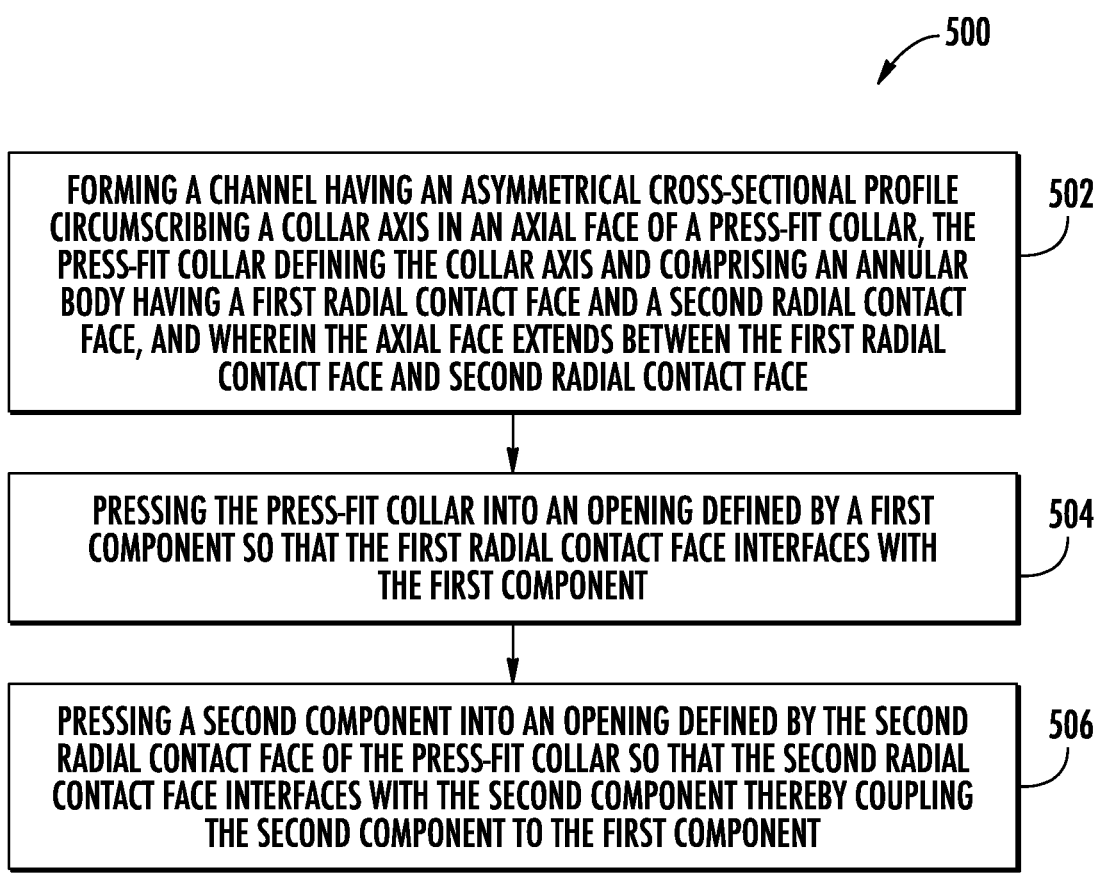
FIG. 7 provides a flow diagram of a method for reducing edge contact stress concentrations in a press-fit according to the present disclosure.
Figure 8:
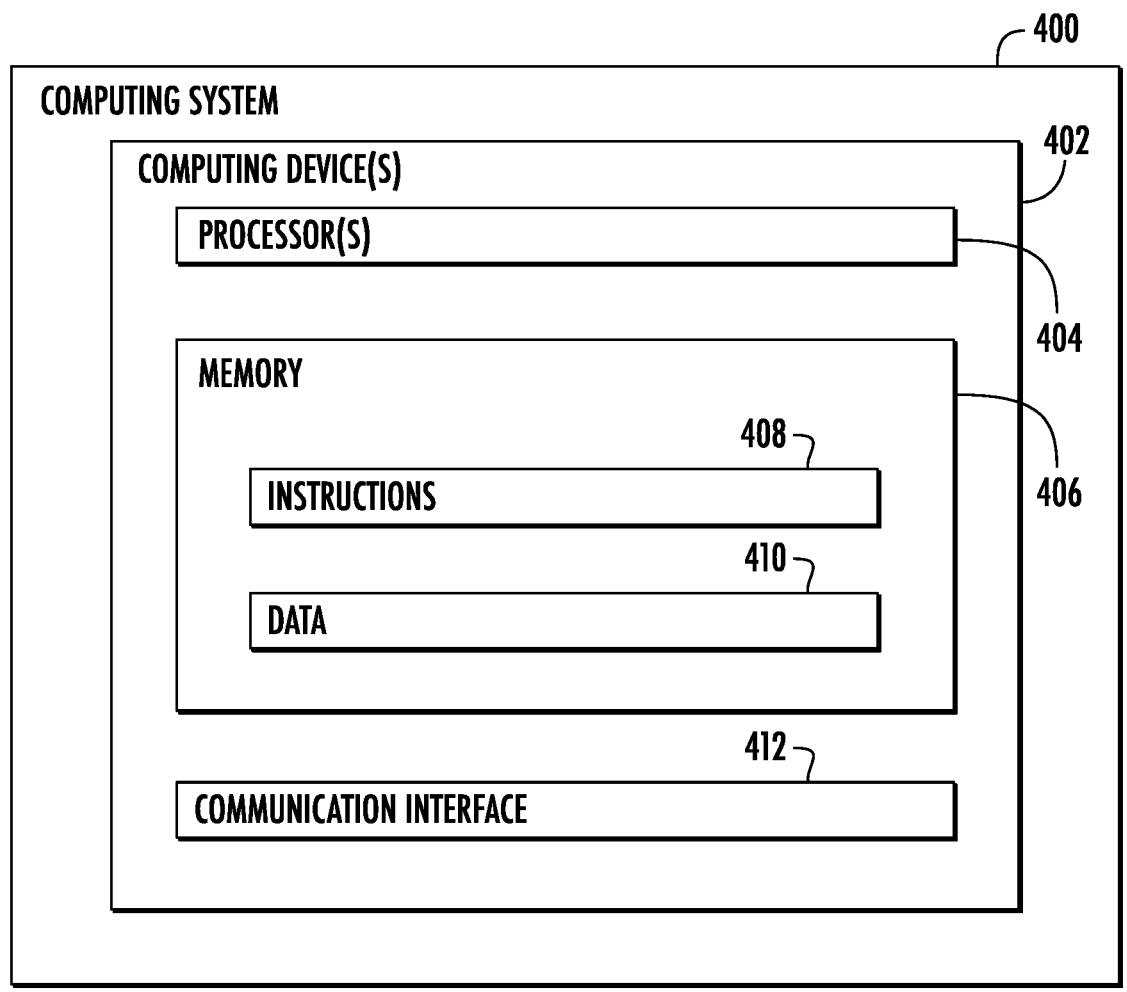
FIG. 8 depicts an exemplary controller such as for use in implementing the method of FIG. 7 according to the present disclosure.

Referring now to FIG. 7, a flow diagram of a method 500 for reducing edge contact stress concentrations in the press-fit coupling 300 is presented. In general, the method 500 will be described herein with reference to the press-fit collar 302 shown in FIGS. 3-6. Although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and-or adapted in various ways without deviating from the scope of the present disclosure.

As shown in FIG. 8, the method 500 may include, at 502, forming the channel having an asymmetrical cross-sectional profile circumscribing the collar axis in the axial face of the press-fit collar. The press-fit collar may define the collar axis and include the annular body having the first radial contact face and the second radial contact face. The axial face may extend between the first radial contact face and the second radial contact face. As shown at 504, the method 500 may include pressing the press-fit collar into the opening defined by the first component so that the first radial contact face interfaces with the first component. As shown at 506, the method 500 may include pressing the second component into the opening defined by the second radial contact face of the press-fit collar so that the second radial contact face interfaces with the second component thereby coupling the second component to the first component.

In an embodiment, forming the channel having the asymmetrical cross-sectional profile may include calculating a first edge stress concentration along the first radial contact face and a second edge stress concentration along the second radial contact face. The method may also include forming the base portion of the channel. The base portion may define the first angle relative to the second radial contact face which is less than 90°. The first angle may be set so as to transmit a portion of the second edge stress concentration radially outward from the second radial contact face. The method may also include forming the first slope face of the channel. The first slope face may define the second angle relative to the second radial contact face which is less than the first angle. The second angle may be set so as to transmit a portion of the second edge stress concentration radially outward from the second radial contact face. The method may also include forming the second slope face of the channel. The second slope face may be disposed radially outward of the first slope face. The base portion may be disposed between the first slope face and the second slope face.

In an additional embodiment, forming the channel having the asymmetrical cross-sectional profile may also include defining the first axial portion extending along the axial face between the second radial contact face and the first slope face. The first axial portion may define a first portion thickness. The method may also include defining the second axial portion extending along the axial face between the first radial contact face and the second slope face. The second axial portion may define a second portion thickness which is greater than the first portion thickness. Additionally, the method may include positioning the channel at a location which results in a first portion thickness configured to reduce the edge contact stress concentration at the second radial contact face. Further, the method may include establishing the second portion thickness to reduce the stress concentration at the first radial contact face by setting the fourth angle between the second slope face and the first radial contact face Referring again to FIG. 1, in general, the engine 100 may include a core gas turbine engine (indicated generally by reference character 114) and a fan section 116 positioned upstream thereof. The core engine 114 may generally include a substantially tubular outer casing 118 that defines an annular inlet 120. In addition, the outer casing 118 may further enclose and support a booster compressor 122 for increasing the pressure of the air that enters the core engine 114 to a first pressure level. A high-pressure, multi-stage, axial-flow compressor 124 may then receive the pressurized air from the booster compressor 122 and further increase the pressure of such air. The pressurized air exiting the high-pressure compressor 124 may then flow to a combustor 126 within which fuel is injected by a fuel system 162 into the flow of pressurized air, with the resulting mixture being combusted within the combustor 126. The high energy combustion products are directed from the combustor 126 along the hot gas path of the engine 100 to a first (high-pressure, HP) turbine 128 for driving the high-pressure compressor 124 via a first (high-pressure, HP) drive shaft 130, and then to a second (low-pressure, LP) turbine 132 for driving the booster compressor 122 and fan section 116 via a second (low-pressure, LP) drive shaft 134 that is generally coaxial with first drive shaft 130. After driving each of turbines 128 and 132, the combustion products may be expelled from the core engine 114 via an exhaust nozzle 136 to provide propulsive jet thrust.

It should be appreciated that each turbine 128, 132 may generally include one or more turbine stages, with each stage including a turbine nozzle and a downstream turbine rotor. As will be described below, the turbine nozzle may include a plurality of vanes disposed in an annular array about the centerline axis 112 of the engine 100 for turning or otherwise directing the flow of combustion products through the turbine stage towards a corresponding annular array of rotor blades forming part of the turbine rotor. As is generally understood, the rotor blades may be coupled to a rotor disk of the turbine rotor, which is, in turn, rotationally coupled to the turbine's drive shaft (e.g., drive shaft 130 or 134).

Additionally, as shown in FIG. 1, the fan section 116 of the engine 100 may generally include a rotatable, axial-flow fan rotor 138 that configured to be surrounded by an annular fan casing 140. In particular embodiments, the (LP) drive shaft 134 may be connected directly to the fan rotor 138 such as in a direct-drive configuration. In alternative configurations, the (LP) drive shaft 134 may be connected to the fan rotor 138 via a gearbox 137, which may have an epicyclic gearing 200 in an indirect-drive or geared-drive configuration. Such speed reduction devices may be included between any suitable shafts/spools within engine 100 as desired or required. It should be appreciated that the gearbox 137 may be located at any suitable location within the engine 100, to include the LP turbine 132.

It should be appreciated by those of ordinary skill in the art that the fan casing 140 may be configured to be supported relative to the core engine 114 by a plurality of substantially radially-extending, circumferentially-spaced outlet guide vanes 142. As such, the fan casing 140 may enclose the fan rotor 138 band its corresponding fan rotor blades 144. Moreover, a downstream section 146 of the fan casing 140 may extend over an outer portion of the core engine 114 so as to define a secondary, or by-pass, airflow conduit 148 that provides additional propulsive jet thrust.

During operation of the engine 100, it should be appreciated that an initial air flow (indicated by arrow 150) may enter the engine 100 through an associated inlet 152 of the fan casing 140. The air flow 150 then passes through the fan blades 144 and splits into a first compressed air flow (indicated by arrow 154) that moves through conduit 148 and a second compressed air flow (indicated by arrow 156) which enters the booster compressor 122. The pressure of the second compressed air flow 156 is then increased and enters the high-pressure compressor 124 (as indicated by arrow 158). After mixing with fuel and being combusted within the combustor 126, the combustion products 160 exit the combustor 126 and flow through the first turbine 128. Thereafter, the combustion products 160 flow through the second turbine 132 and exit the exhaust nozzle 136 to provide thrust for the engine 100.

FIG. 8 provides a block diagram of an example computing system 400 that is representative of a computing device for implementing the exemplary method 500 described herein according to exemplary embodiments of the present subject matter. As shown, the computing system 400 may include one or more computing device(s) 402. The one or more computing device(s) 402 may include one or more processor(s) 404 and one or more memory device(s) 406. The one or more processor(s) 404 may include any suitable processing device, such as a microprocessor, microcontroller, integrated circuit, logic device, or other suitable processing device. The one or more memory device(s) 406 may include one or more computer-readable media, including, but not limited to, non-transitory computer-readable media, RAM, ROM, hard drives, flash drives, or other memory devices.

The one or more memory device(s) 406 may store information accessible by the one or more processor(s) 404, including computer-readable instructions 408 that may be executed by the one or more processor(s) 404. The instructions 408 may be any set of instructions that when executed by the one or more processor(s) 404, cause the one or more processor(s) 404 to perform operations. The instructions 408 may be software written in any suitable programming language or may be implemented in hardware. In some embodiments, the instructions 408 may be executed by the one or more processor(s) 404 to cause the one or more processor(s) 404 to perform the processes for reducing edge contact stress concentration in a press-fit, or for implementing any of the other processes described herein.

The memory device(s) 404 may further store data 410 that may be accessed by the processor(s) 404. For example, the data 410 may include the number of gears pairs to be supported, dissipated loads, volume limitations, manufacturing processes, or material properties as described herein. The data 410 may include one or more table(s), function(s), algorithm(s), model(s), equation(s), etc. according to example embodiments of the present subject matter.

The one or more computing device(s) 402 may also include a communication interface 412 used to communicate, for example, with the other components of system. The communication interface 412 may include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. An epicyclic gearing for a gas turbine aviation engine, the epicyclic gearing comprising: a plurality of planet gears circumferentially disposed about a transmission axis and operably coupled to a plurality of planet pins; a planet-carrier, the planet-carrier comprising: a side plate comprising a coupling portion for connecting the side plate to a rotating member or to a static structure, and a central ring coaxial to the side plate along the transmission axis, each planet pin of the plurality of planet pins being coupled to the central ring via a press-fit collar; and the press-fit collar defining a collar axis and comprising an annular body having: a first radial contact face defining a collar outer diameter, the first radial contact face being configured to interface with a pin opening defined by the central ring, a second radial contact face disposed radially inward of the first radial contact face and defining a collar inner diameter centered about a collar axis, the second radial contact face being configured to accept one of the plurality of planet pins, and an axial face extending between the first radial contact face and the second radial contact face, the axial face facing the plurality of planet gears, the axial face defining a channel having an asymmetrical cross-sectional profile, the channel circumscribing the collar axis, wherein the asymmetrical cross-sectional profile is configured to reduce an edge contact pressure.

Clause 2. The epicyclic gearing of any preceding clause, wherein the axial face further comprises: a first axial portion extending along the axial face between the second radial contact face and a first slope face of the channel, the first axial portion having a first portion thickness, and a second axial portion extending along the axial face between the first radial contact face and a second slope face of the channel, the second axial portion having a second portion thickness and wherein the second portion thickness is greater than the first portion thickness.

Clause 3. The epicyclic gearing of any preceding clause, wherein the channel further comprises a base portion disposed between the first slope face and the second slope face, wherein the base portion defines a first angle relative to the second radial contact face which is less than 90-degrees, and wherein the first slope face defines a second angle relative to the second radial contact face which is less than the first angle.

Clause 4. The epicyclic gearing of any preceding clause, wherein the axial face is a first axial face at a first axial position, the press-fit collar further comprising: a second axial face extending between the first radial contact face and the second radial contact face at a second axial position, the second axial face defining a recess circumscribing the collar axis.

Clause 5. The epicyclic gearing of any preceding clause, wherein the central ring comprises a groove circumscribing the collar axis.

Clause 6. The epicyclic gearing of any preceding clause, wherein the plurality of planet pins comprise at least five planet pins.

Clause 7. A press-fit collar for coupling a first component to a second component, the press-fit collar defining a collar axis and comprising an annular body having: a first radial contact face defining a collar outer diameter, the first radial contact face being configured to interface with the first component; a second radial contact face disposed radially inward of the first radial contact face and defining a collar inner diameter centered about a collar axis, the second radial contact face being configured to interface with the second component; and an axial face extending between the first radial contact face and the second radial contact face, the axial face defining a channel having an asymmetrical cross-sectional profile, the channel circumscribing the collar axis, wherein the asymmetrical cross-sectional profile is configured to reduce an edge contact pressure.

Clause 8. The press-fit collar of any preceding clause, wherein the axial face further comprises: a first axial portion extending along the axial face between the second radial contact face and a first slope face of the channel, the first axial portion having a first portion thickness, and a second axial portion extending along the axial face between the first radial contact face and a second slope face of the channel, the second axial portion having a second portion thickness and wherein the second portion thickness is greater than the first portion thickness.

Clause 9. The press-fit collar of any preceding clause, wherein the channel further comprises a base portion disposed between the first slope face and the second slope face, wherein the base portion defines a first angle relative to the second radial contact face which is less than 90-degrees, and wherein the first slope face defines a second angle relative to the second radial contact face which is less than the first angle.

Clause 10. The press-fit collar of any preceding clause, wherein the first angle is greater than or equal to 70-degrees and less than or equal to 80-degrees, and wherein the second angle is greater than or equal to 30-degrees and less than or equal to 40-degrees.

Clause 11. The press-fit collar of any preceding clause, wherein the axial face is a first axial face at a first axial position, the press-fit collar further comprising: a second axial face extending between the first radial contact face and the second radial contact face at a second axial position, the second axial face defining a recess circumscribing the collar axis.

Clause 12. The press-fit collar of any preceding clause, wherein the first component comprises a groove circumscribing the collar axis.

Clause 13. The press-fit collar of any preceding clause, wherein the axial face is oriented toward a load acting on the second component.

Clause 14. The press-fit collar of any preceding clause, wherein the first component is a planet-carrier of an epicyclic gearing arrangement, and wherein the second component is a planet pin configured to support a planet gear in the epicyclic gearing arrangement.

Clause 15. A method for reducing edge contact stress concentrations in a press-fit, the method comprising: forming a channel having an asymmetrical cross-sectional profile circumscribing a collar axis in an axial face of a press-fit collar, the press-fit collar defining the collar axis and comprising an annular body having a first radial contact face and a second radial contact face, and wherein the axial face extends between the first radial contact face and second radial contact face; pressing the press-fit collar into an opening defined by a first component so that the first radial contact face interfaces with the first component; and pressing a second component into an opening defined by the second radial contact face of the press-fit collar so that the second radial contact face interfaces with the second component thereby coupling the second component to the first component.

Clause 16. The method of any preceding clause, wherein forming the channel having the asymmetrical cross-sectional profile further comprises: calculating a first edge stress concentration along the first radial contact face; calculating a second edge stress concentration along the second radial contact face; forming a base portion of the channel, the base portion defining a first angle relative to the second radial contact face which is less than 90-degrees, the first angle being set so as to transmit a portion of the second edge stress concentration radially outward from the second radial contact face; forming a first slope face of the channel, the first slope face defining a second angle relative to the second radial contact face which is less than the first angle, the second angle being set so as to transmit a portion of the second edge stress concentration radially outward from the second radial contact face; and forming a second slope face of the channel, the second slope face being disposed radially outwardly of the first slope face, wherein the base portion is disposed between the first slope face and the second slope face.

Clause 17. The method of any preceding clause, wherein forming the channel having the asymmetrical cross-sectional profile further comprises: defining a first axial portion extending along the axial face between the second radial contact face and the first slope face, the first axial portion having a first portion thickness; defining a second axial portion extending along the axial face between the first radial contact face and the second slope face, the second axial portion having a second portion thickness which is greater than the first portion thickness; positioning the channel at a location which results in a first portion thickness configured to reduce the second edge contact stress concentration; and establishing the second portion thickness configured to reduce the first edge contact stress concentration by setting a fourth angle between the second slope face and the first radial contact face.

Clause 18. The method of any preceding clause, wherein forming the channel having the asymmetrical cross-sectional profile further comprises positioning the base portion at an axial location calculated to reduce the second edge contact stress concentration.

Clause 19. The method of any preceding clause, wherein the axial faces a first axial face at a first axial position, the method further comprising: forming a recess circumscribing the collar axis in a second axial face of the press-fit collar, the second axial face being located at a second axial position.

Clause 20. The method of any preceding clause, further comprising: forming a groove circumscribing the collar axis in the first component.

What is claimed is:

1. An epicyclic gearing for a gas turbine aviation engine, the epicyclic gearing comprising:
   a plurality of planet gears circumferentially disposed about a transmission axis and operably coupled to a plurality of planet pins;
   a planet-carrier, the planet-carrier comprising:
      a side plate comprising a coupling portion for connecting the side plate to a rotating member or to a static structure, and
      a central ring coaxial to the side plate along the transmission axis, each planet pin of the plurality of planet pins being coupled to the central ring via a press-fit collar; and
   the press-fit collar defining a collar axis and comprising an annular body having:
      a first radial contact face defining a collar outer diameter, the first radial contact face being configured to interface with a pin opening defined by the central ring,
      a second radial contact face disposed radially inward of the first radial contact face and defining a collar inner diameter centered about a collar axis, the second radial contact face being configured to accept one of the plurality of planet pins, and
      an axial face extending between the first radial contact face and the second radial contact face, the axial face facing the plurality of planet gears, the axial face defining a channel having an asymmetrical cross-sectional profile, the channel circumscribing the collar axis, wherein the asymmetrical cross-sectional profile is configured to reduce an edge contact pressure.

2. The epicyclic gearing of claim 1, wherein the axial face further comprises:
   a first axial portion extending along the axial face between the second radial contact face and a first slope face of the channel, the first axial portion having a first portion thickness, and
   a second axial portion extending along the axial face between the first radial contact face and a second slope face of the channel, the second axial portion having a second portion thickness and wherein the second portion thickness is greater than the first portion thickness.

3. The epicyclic gearing of claim 2, wherein the channel further comprises a base portion disposed between the first slope face and the second slope face, wherein the base portion defines a first angle relative to the second radial contact face which is less than 90-degrees, and wherein the first slope face defines a second angle relative to the second radial contact face which is less than the first angle.

4. The epicyclic gearing of claim 1, wherein the axial face is a first axial face at a first axial position, the press-fit collar further comprising:
   a second axial face extending between the first radial contact face and the second radial contact face at a second axial position, the second axial face defining a recess circumscribing the collar axis.

5. The epicyclic gearing of claim 1, wherein the central ring comprises a groove circumscribing the collar axis.

6. The epicyclic gearing of claim 1, wherein the plurality of planet pins comprise at least five planet pins.

7. The epicyclic gearing of claim 1, wherein the press-fit collar is pressed into the pin opening defined by the central ring of the planet-carrier, and the one of the plurality of planet pins is pressed into the press-fit collar.

8. A press-fit collar for coupling a planet-carrier of a planetary gearing to a planet pin that supports a planet gear of the planetary gearing, the press-fit collar defining a collar axis and comprising an annular body having:
   a first radial contact face defining a collar outer diameter, the first radial contact face being configured to interface with a pin opening defined by a central ring of the planet-carrier;
   a second radial contact face disposed radially inward of the first radial contact face and defining a collar inner diameter centered about a collar axis, the second radial contact face being configured to interface with the planet pin; and
   an axial face extending between the first radial contact face and the second radial contact face, the axial face defining a channel having an asymmetrical cross-sectional profile, the channel circumscribing the collar axis, wherein the asymmetrical cross-sectional profile is configured to reduce an edge contact pressure.

9. The press-fit collar of claim 8, wherein the axial face further comprises:
   a first axial portion extending along the axial face between the second radial contact face and a first slope face of the channel, the first axial portion having a first portion thickness, and
   a second axial portion extending along the axial face between the first radial contact face and a second slope face of the channel, the second axial portion having a second portion thickness and wherein the second portion thickness is greater than the first portion thickness.

10. The press-fit collar of claim 9, wherein the channel further comprises a base portion disposed between the first slope face and the second slope face, wherein the base portion defines a first angle relative to the second radial contact face which is less than 90-degrees, and wherein the first slope face defines a second angle relative to the second radial contact face which is less than the first angle.

11. The press-fit collar of claim 10, wherein the first angle is greater than or equal to 70-degrees and less than or equal to 80-degrees, and wherein the second angle is greater than or equal to 30-degrees and less than or equal to 40-degrees.

12. The press-fit collar of claim 8, wherein the axial face is a first axial face at a first axial position, the press-fit collar further comprising:
   a second axial face extending between the first radial contact face and the second radial contact face at a second axial position, the second axial face defining a recess circumscribing the collar axis.

13. The press-fit collar of claim 8, wherein the central ring of the planet-carrier comprises a groove circumscribing the collar axis.

14. The press-fit collar of claim 8, wherein the axial face is oriented toward a load acting on the planet pin.

15. A method for reducing edge contact stress concentrations in a press-fit, the method comprising:
   forming a channel having an asymmetrical cross-sectional profile circumscribing a collar axis in an axial face of a press-fit collar, the press-fit collar defining the collar axis and comprising an annular body having a first radial contact face and a second radial contact face, and wherein the axial face extends between the first radial contact face and the second radial contact face;

pressing the press-fit collar into a pin opening defined by a central ring of a planet-carrier so that the first radial contact face interfaces with the pin opening of the central ring; and pressing a planet pin into an opening defined by the second radial contact face of the press-fit collar so that the second radial contact face interfaces with the planet pin thereby coupling the planet pin to the central ring of the planet-carrier.

16. The method of claim 15, wherein forming the channel having the asymmetrical cross-sectional profile further comprises:

calculating a first edge contact stress concentration along the first radial contact face;

calculating a second edge contact stress concentration along the second radial contact face;

forming a base portion of the channel, the base portion defining a first angle relative to the second radial contact face which is less than 90-degrees, the first angle being set so as to transmit a portion of the second edge contact stress concentration radially outward from the second radial contact face;

forming a first slope face of the channel, the first slope face defining a second angle relative to the second radial contact face which is less than the first angle, the second angle being set so as to transmit a portion of the second edge contact stress concentration radially outward from the second radial contact face; and forming a second slope face of the channel, the second slope face being disposed radially outwardly of the first slope face, wherein the base portion is disposed between the first slope face and the second slope face.

17. The method of claim 16, wherein forming the channel having the asymmetrical cross-sectional profile further comprises:

defining a first axial portion extending along the axial face between the second radial contact face and the first slope face, the first axial portion having a first portion thickness;

defining a second axial portion extending along the axial face between the first radial contact face and the second slope face, the second axial portion having a second portion thickness which is greater than the first portion thickness;

positioning the channel at a location which results in a first portion thickness configured to reduce the second edge contact stress concentration; and establishing the second portion thickness configured to reduce the first edge contact stress concentration by setting a fourth angle between the second slope face and the first radial contact face.

18. The method of claim 16, wherein forming the channel having the asymmetrical cross-sectional profile further comprises positioning the base portion at an axial location calculated to reduce the second edge contact stress concentration.

19. The method of claim 15, wherein the axial face is a first axial face at a first axial position, the method further comprising:

forming a recess circumscribing the collar axis in a second axial face of the press-fit collar, the second axial face being located at a second axial position.

20. The method of claim 15, further comprising:

forming a groove circumscribing the collar axis in the central ring of the planet-carrier.

* * * * *